(12) United States Patent
Smith et al.

(10) Patent No.: US 12,077,952 B2
(45) Date of Patent: Sep. 3, 2024

(54) SYSTEMS AND METHODS FOR AUTOMATICALLY CONTROLLING A FAUCET

(71) Applicant: Kohler Co., Kohler, WI (US)

(72) Inventors: Joel T. Smith, Cedarburg, WI (US); Gregory de Swarte, Sheboygan, WI (US); Marwan E. Estiban, Mequon, WI (US); Krishna C. Poduru, Sheboygan, WI (US)

(73) Assignee: Kohler Co., Kohler, WI (US)

(*) Notice: Subject to any disclaimer, the term of this patent is extended or adjusted under 35 U.S.C. 154(b) by 595 days.

(21) Appl. No.: 16/711,962

(22) Filed: Dec. 12, 2019

(65) Prior Publication Data

US 2020/0209897 A1 Jul. 2, 2020

Related U.S. Application Data

(60) Provisional application No. 62/786,902, filed on Dec. 31, 2018.

(51) Int. Cl.
*E03C 1/05* (2006.01)
*E03C 1/04* (2006.01)
(Continued)

(52) U.S. Cl.
CPC ............ *E03C 1/057* (2013.01); *E03C 1/0404* (2013.01); *F16K 37/005* (2013.01);
(Continued)

(58) Field of Classification Search
CPC .............. F16K 37/005; F16K 37/0058; G05D 7/0623; E03C 1/0404; E03C 1/057; G06K 9/6267
(Continued)

(56) References Cited

U.S. PATENT DOCUMENTS 4,628,533 A * 12/1986 Hongo ................. G06V 10/751
                                                    382/205
5,025,516 A *  6/1991 Wilson .................... E03C 1/057
                                                    250/221
(Continued)

FOREIGN PATENT DOCUMENTS

DE   10 2014 109 304    1/2016
WO   WO-2013/111374     8/2013

OTHER PUBLICATIONS

Extended European Search Report, App. No. 19219186.4, Kohler Co. (Apr. 21, 2020).
(Continued)

*Primary Examiner* — Matthew W Jellett
(74) *Attorney, Agent, or Firm* — Husch Blackwell LLP

(57) ABSTRACT

A faucet includes a spout configured to direct fluid into a sink, a camera arranged to capture images of the sink, and a processing circuit. The processing circuit may receive an image from the camera. The image may include an object positioned beneath the spout. The processing circuit may analyze the image received from the camera to assign a classification to the object included in the image. The processing circuit may cause the spout to direct fluid into the sink with fluid flow characteristics that correspond to the classification of the object in the image.

15 Claims, 3 Drawing Sheets

(51) Int. Cl.
*F16K 37/00* (2006.01)
*G05D 7/06* (2006.01)
*G06F 18/24* (2023.01)

(52) U.S. Cl.
CPC ....... *F16K 37/0058* (2013.01); *G05D 7/0623* (2013.01); *G06F 18/24* (2023.01)

(58) Field of Classification Search
USPC .................................................. 251/129.04
See application file for complete search history.

(56) References Cited

U.S. PATENT DOCUMENTS

| | | | | |
|---|---|---|---|---|
| 6,211,787 B1* | 4/2001 | Yoshiike | ................ | G01S 17/04 |
| | | | | 600/595 |
| 6,321,785 B1* | 11/2001 | Bergmann | ......... | G05D 23/1393 |
| | | | | 137/606 |
| 7,396,000 B2 | 7/2008 | Parsons | ................ | F16K 19/006 |
| | | | | 4/304 |
| 8,162,236 B2* | 4/2012 | Rodenbeck | ............ | E03C 1/057 |
| | | | | 239/447 |
| 8,572,772 B2* | 11/2013 | Wolf | ....................... | E03C 1/057 |
| | | | | 4/678 |
| 9,032,564 B2 | 5/2015 | Reeder et al. | | |
| 9,266,136 B2 | 2/2016 | Klicpera | | |
| 9,458,612 B2 | 10/2016 | Thomas et al. | | |
| 9,822,519 B2 | 11/2017 | Hall et al. | | |
| 9,840,833 B2 | 12/2017 | Chen | | |
| 10,233,621 B2* | 3/2019 | Park | ....................... | F16K 31/02 |
| 2006/0231782 A1* | 10/2006 | Iott | ........................ | E03C 1/057 |
| | | | | 251/129.04 |
| 2008/0256494 A1* | 10/2008 | Greenfield | ............. | G06V 40/28 |
| | | | | 715/863 |
| 2009/0056011 A1 | 3/2009 | Wolf et al. | | |
| 2016/0328880 A1 | 11/2016 | Sajapuram et al. | | |
| 2018/0148912 A1 | 5/2018 | Park | | |

OTHER PUBLICATIONS

Office Action corresponding to CN201911405507.4 dated Mar. 28, 2023.
English Summary of Office Action corresponding to CN201911405507.4 dated Mar. 28, 2023.
Office Action and English Summary corresponding to 201911405507.4, dated Oct. 12, 2023.

* cited by examiner

SYSTEMS AND METHODS FOR AUTOMATICALLY CONTROLLING A FAUCET

CROSS-REFERENCE TO RELATED PATENT APPLICATIONS

This application claims priority to and the benefit of U.S. Provisional Application No. 62/786,902, filed Dec. 31, 2018, the entire disclosure of which is incorporated herein by reference in its entirety.

BACKGROUND

The present application relates generally to the field of faucets. More specifically, the present application relates to faucets that include features allowing for the automatic control of the faucet.

Faucets provide and direct fluids (e.g., water) to a sink or other basin. Many faucets are manually controlled via one or more handles, for instance. Such faucets are turned on and off by or through manual rotation of handle(s) located near the faucet.

Some faucets are automatically controlled based on the presence of an object proximate the faucet. These faucets may include a proximity sensor configured to generate a signal when the presence of an object (e.g., a hand) is detected beneath or near a spout of the faucet. The proximity sensor may generate, for instance, a "high" signal which indicates that an object is positioned beneath the spout of the faucet. A faucet controller may receive the high signal and turn on the faucet for so long as the high signal is received (e.g., for so long as the object's presence is detected beneath the spout). Such faucets do not provide for customization of the fluid flow characteristics. Rather, such faucets typically only have two states (e.g., "on" and "off"). In this regard, such faucets may be insufficient where fluid from the faucet is used for different purposes which require different fluid flow characteristics.

It would therefore be advantageous to provide an automatically controlled faucet which adapts fluid flow characteristics to the type of object located beneath the spout.

SUMMARY

One embodiment relates to a system for controlling a faucet. The system may include a spout configured to direct fluid into a sink. The system may include a camera arranged to capture images of the sink. The system may include a processing circuit including a processor and memory. The memory may store instructions that, when executed by the processor, cause the processor to perform operations. The operations may include receiving an image from the camera. The image may include an object positioned beneath the spout. The operations may include analyzing the image received from the camera to assign a classification to the object included in the image. The operations may include causing the spout to direct fluid into the sink with fluid flow characteristics that correspond to the classification of the object in the image.

Another embodiment relates to a faucet. The faucet may include a spout configured to direct fluid into a sink. The faucet may include a processing circuit including a processor and memory. The memory may store instructions that, when executed by the processor, cause the processor to perform operations. The operations may include receiving an image from a camera arranged to capture images of the sink. The image may include an object positioned beneath the spout. The operations may include causing the spout to direct fluid into the sink with fluid flow characteristics that correspond to the object in the image.

Yet another embodiment relates to a method of controlling a faucet. The method may include receiving, by a faucet control system, an image from a camera configured to capture images of a sink. The image may include an object positioned beneath a spout configured to direct fluid into the sink. The method may include analyzing, by the faucet control system, the image received from the camera to assign a classification to the object included in the image. The method may include causing the spout to direct fluid into the sink with fluid flow characteristics that correspond to the classification of the object in the image.

DETAILED DESCRIPTION

Referring to the FIGURES generally, a faucet control system is shown and described according to various exemplary embodiments. The faucet control system shown and described herein is configured to automatically control a faucet according to the type of object positioned beneath the faucet. The faucet control system can control the duration for which the faucet is on, the fluid (e.g., water) flow temperature, the fluid flow rate, and so forth.

In some faucets, when an object is positioned beneath the spout, the faucet is automatically turned on. The faucet remains on until the object is removed or may remain on until some predetermined time has elapsed. Fluid flow characteristics in such faucets are typically fixed. Hence, the temperature and flow rate do not change. However, it may be beneficial to have different fluid flow characteristics depending on the use of the water. As one example, where a person is washing their hands, it may be beneficial to have a warmer fluid flow temperature. As another example, where a person is filling a glass, it may be beneficial to have colder fluid flow temperature for a duration to fill the glass. Various other examples of instances where fluid flow characteristics may change depending on use or the object positioned beneath the faucet are described herein.

An imaging sensor, such as a camera, infrared sensor, and so forth, is positioned such that it has a field of view directed toward the sink. The camera is configured to capture images of an object as a user positions the object beneath the spout. The object may be, for instance, the user's hands, a cup or bottle, a toothbrush, a pot, a dish, etc. A faucet control system receives the images from the camera. The faucet control system processes the image to detect and classify the object included in the image. The faucet control system causes the spout to direct fluid into the sink with fluid flow characteristics which correspond to the classification of the object in the image. According to the embodiments described herein, the fluid flow characteristics from the spout are dynamically changed and controlled according to the object positioned beneath the spout. According to the embodiments described herein, the faucet is automatically controlled to adapt to particular uses based on the type of object positioned in the sink. Various other benefits and advantages will become apparent based on the discussion below.

Figure 1:
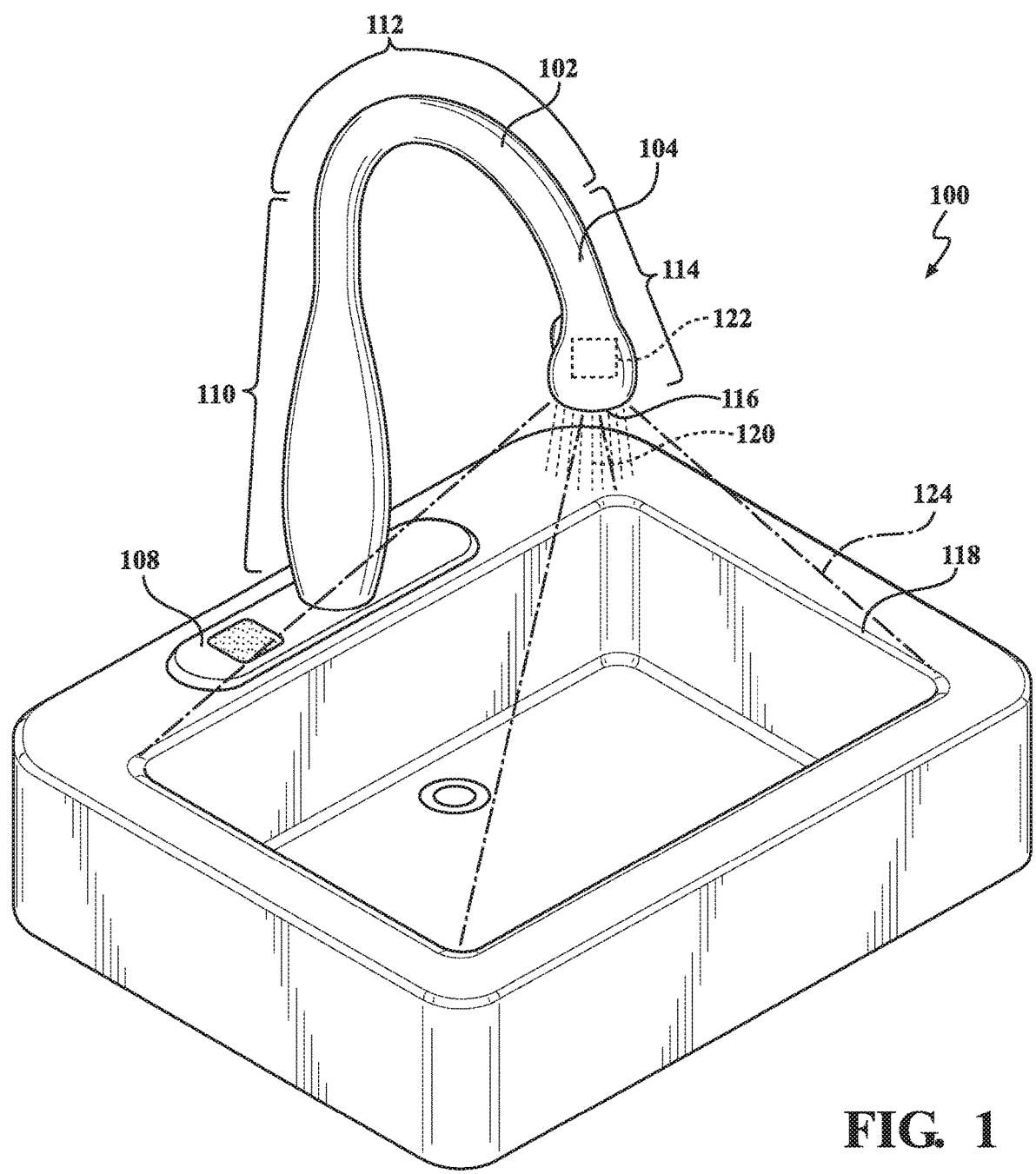
FIG. 1 is a perspective view of a faucet assembly.

Referring now to FIG. 1, depicted is a perspective view of a faucet assembly 100, according to an illustrative embodiment. The faucet assembly 100 may be used or incorporated into any environment including, but not limited to, a bathroom, kitchen, etc. The faucet assembly 100 is shown to include a faucet 102 having a spout 104 and a sink 106. The faucet 102 may be mounted to the sink 106 via a mounting plate 108. In some embodiments, the faucet 102 may be mounted directly to a surface adjacent to the sink 106 (a countertop, for instance). The spout 104 extends upwardly from the mounting plate 108 in an inverted J-shaped manner. The spout 104 has an extension portion 110 which extends outwardly from the mounting plate 108 (e.g., vertically away from the sink 106 as shown in FIG. 1), an arched portion 112, and an end portion 114 which extends in the opposite direction from the extension portion 110 (e.g., vertically towards the sink 106 as shown in FIG. 1). The arched portion 112 connects the extension portion 110 to the end portion 114. The end portion 114 includes an opening 116 which faces an opening 118 of the sink 106. Of course, according to other exemplary embodiments, the size, shape, and configuration of the faucet may differ from that shown in the accompanying drawing figures, and all such variations are within the scope of the present disclosure.

In operation, water 120 (or other fluid) flows into the faucet 102 (e.g., from a water source), up the extension portion 110 of the spout 104, through the arched portion 112, and out of the opening 116 of the end portion 114 into the sink 106. In some implementations, a user manually turns on the faucet 102 through rotation or other manipulations of handles which are located in close proximity to the faucet 102. In some touchless applications, a user turns on the faucet 102 by positioning their hands beneath the spout 104. A sensor detects an object (e.g., the user's hands) beneath the spout 104 and activates a solenoid valve to induce fluid flow into the sink. In such touchless applications, fluid flow is binary (e.g., "on" and "off" based on the presence or absence of an object beneath the spout 104). According to the embodiments described herein, the fluid flow characteristics are adapted based on the type of object positioned beneath the spout 104.

Figure 2:
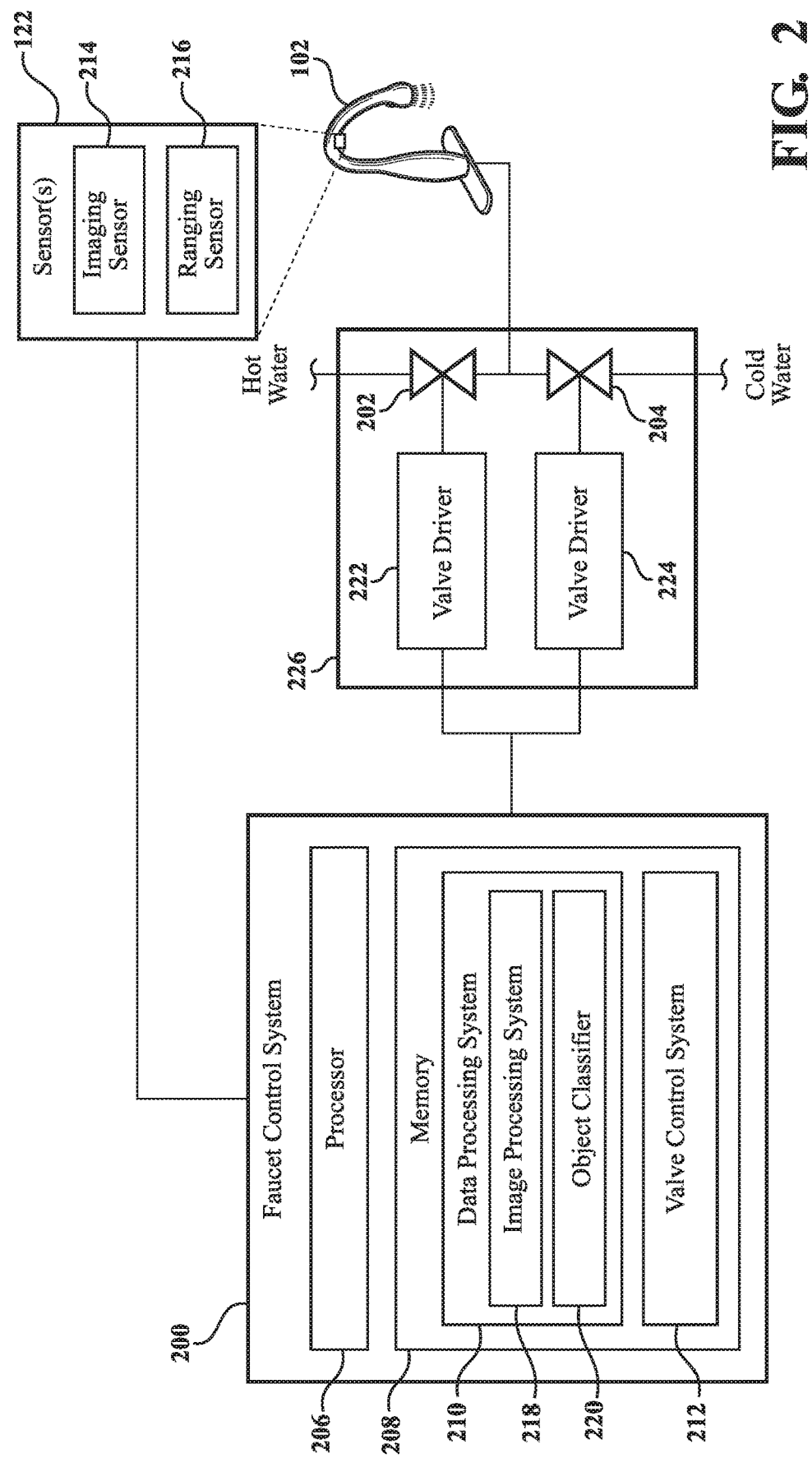
FIG. 2 is a schematic diagram of a faucet control system for the faucet assembly of FIG. 1.

The faucet 102 is shown to include one or more sensors 122. The sensor(s) 122 are mounted to have a field of view 124 which includes the sink 106. Hence, the sensor(s) 122 generally face outwardly from the faucet 102 towards the sink 106. The sensor(s) 122 may be mounted at or near the end portion 114 as shown in FIG. 1, on an underside of the arched portion 112 as shown in FIG. 2, or in any other location such that the sensor(s) 122 have a field of view 124 which includes the sink 106. In some implementations, the sensor(s) 122 may be mounted or otherwise incorporated in a housing. The housing may be manufactured to prevent or inhibit water damage, build-up, etc. for the sensor(s) 122, thus maintaining the integrity of the sensor(s) 122 located or incorporated therein.

Referring now to FIG. 2, depicted is a schematic diagram of a faucet control system 200 for the faucet assembly 100. Generally speaking, the faucet control system 200 is configured to control valves 202, 204, which regulate flow from a hot and cold water source, respectively. The faucet control system 200 controls the valves 202, 204 based on, at least in part, data from the sensors 122. The faucet control system 200 is shown to include a processor 206 and memory 208. The memory 208 stores a data processing system 210 and a valve control system 212. The faucet control system 200 is communicably coupled to the sensor(s) 122. The sensor(s) 122 may include, at least, an imaging sensor 214 and ranging sensor(s) 216. The faucet control system 200 receives data generated by the sensor(s) 122. The data processing system 208 includes an image processing system 218 and an object classifier 220. The image processing system 218 is configured to process images or other data received from the imaging sensor 214. The image processing system 218 is configured to identify objects included in the images. The object classifier 220 is configured to classify the objects in the images. The valve control system 210 is configured to generate control signals for valve drivers 222, 224 for the valves 202, 204 to control fluid flow characteristics of fluid flowing from the faucet 102 based on the classification of the objects in the images.

The processor 206 and memory 208 may form a processing circuit. The processor 206 may be configured to execute instructions stored in the memory 208 or may execute instructions otherwise accessible to the processor 206. In some embodiments, the one or more processors 206 may be embodied in various ways. The processor 206 may be constructed in a manner sufficient to perform at least the operations described herein. In some embodiments, the processor 206 may be shared by multiple circuits (e.g., circuit A and circuit B may comprise or otherwise share the same processor which, in some example embodiments, may execute instructions stored, or otherwise accessed, via different areas of memory 208). Alternatively or additionally, the processor 206 may be structured to perform or otherwise execute certain operations independent of one or more co-processors. In other example embodiments, two or more processors 206 may be coupled via a bus to enable independent, parallel, pipelined, or multi-threaded instruction execution. Each processor 206 may be implemented as one or more general-purpose processors, application specific integrated circuits (ASICs), field programmable gate arrays (FPGAs), digital signal processors (DSPs), or other suitable electronic data processing components structured to execute instructions provided by memory. The processor 206 may take the form of a single core processor, multi-core processor (e.g., a dual core processor, triple core processor, quad core processor, etc.), microprocessor, etc.

The memory 208 may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. The memory 208 may store machine-readable executable instructions which are executed by the processor 206. In this regard, machine-executable instructions comprise, for example, instructions and data which cause a general purpose computer, special purpose computer, or special purpose processing machines to perform a certain function or group of functions. The memory 208 may be operable to maintain or otherwise store information relating to the operations performed by one or more associated circuits, including processor instructions and related data (e.g., database components, object code components, script components, etc.), in accordance with the example embodiments described herein.

In some embodiments, at least some of the components of the faucet control system 200 may execute locally. For instance, the processor 206 and memory 208 may be implemented, incorporated, or otherwise execute on a local computing device which is located at or near the faucet assembly 100. For instance, the local computing device may be mounted at or near the sink 106, faucet 102, etc. The facet control system 200 is communicably coupled to the sensor(s) 122. The faucet control system 200 may be configured to execute locally to process data received from the sensor(s) 122 and control the valves 202, 204 based on, at least, the data from the sensor(s) 122.

The sensor(s) 122 are shown to include an imaging sensor 214. In some embodiments, the imaging sensor 214 may include a camera. The camera can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, or a linear array sensor, just to name a few possibilities. The image capture element may capture images in any suitable wavelength on the electromagnetic spectrum. The image capture element may capture color images and/or grayscale images. In other embodiments, the imaging sensor 214 may include other types of sensors configured to generate image data. For instance, the imaging sensor 214 may include an infrared sensor, a plurality of ranging sensors, and so forth.

The sensor(s) 122 are shown to include a ranging sensor 216. The ranging sensor 216 can include a signal transmitter (not shown), a signal detector (not shown), and a timer. The ranging sensor 216 may be configured to transmit a signal into or toward a medium (e.g., via the signal transmitter). The ranging sensor 216 may be configured to detect the signal reflected off the medium (e.g., via the signal detector). The ranging sensor 216 may be configured to calculate a distance (or range) between the signal transmitter and the medium based on the duration between the time in which the signal is transmitted and the reflected signal is detected. Various examples of ranging sensors include, for instance, an ultrasonic sensor, radar sensor, LIDAR sensor, sonar sensor, etc. In some embodiments, the ranging sensor 216 is configured to detect or otherwise generate data corresponding to relative distances or depths. The ranging sensor 216 may be configured to transmit multiple signals toward a medium simultaneously (or near simultaneously). The ranging sensor 216 may be configured to detect reflected signals. The ranging sensor 216 may be configured to detect or otherwise generate data corresponding to relative distances or depths based on the time in which the multiple signals are detected (following reflection off the medium). The ranging sensor 216 may be configured to transmit multiple signals with a resolution sufficient to detect, for instance, a depth differential of various surfaces of an object. As one example, where a cup is positioned beneath the spout 104, the ranging sensor 216 may be configured to detect a depth differential between a rim of the cup and a bottom of the cup. As the cup is filled with water, the depth differential may change.

The faucet control system 200 is shown to include a data processing system 210. The data processing system 210 is configured to process, interpret, or otherwise analyze data received from the sensor(s) 122. The data processing system 210 may include image processing system 218 and an object classifier 220.

The image processing system 218 and/or object classifier 220 may be or include any software, instructions, or other digital commands which are configured to process images received from the imaging sensor 214. In some embodiments, the image processing system 218 and/or object classifier 220 may be or include a neural network. The neural network may be a series of input layers, hidden layers, and output layer(s) which are configured to receive an input (e.g., an image), process the image to detect various characteristics within the image (e.g., at the hidden layer), and provide an output. The neural network may be trained prior to deployment. Hence, the neural network may be static at deployment (e.g., when processing images from the imaging sensor 214 in real-time).

The image processing system 218 may be or include software and/or hardware generally configured to identify objects within an image received from the imaging sensor 214. Since the imaging sensor 214 is mounted such that the imaging sensor's 214 field of view 124 includes the sink 106, each of the images received from the imaging sensor 214 typically have fixed portions corresponding to the sink 106. Hence, the images typically have a fixed (or set) background. The image processing system 218 may be configured to identify objects within images based on the difference between the background (e.g., the sink 106) and the images received from the imaging sensor 214. The image processing system 218 may be configured to compare the images received from the imaging sensor 214 to a static image of the sink 106 (e.g., when no objects are present in the foreground of the image of the sink 106). The static image of the sink 106 may be stored locally (e.g., within memory 208). The image processing system 218 may be configured to identify objects within the images based on the comparison (e.g., when there is a difference between the static image of the sink 106 and the images received from the imaging sensor 214).

The object classifier 220 may be or include software and/or hardware configured to assign a classification to objects in the images. The object classifier 220 may be configured to assign the classification by, for instance, identifying various features within the portion of the image corresponding to the object, based on object matching, object edge detection and matching, model matching, interpretation trees, and so forth. The object classifier 220 may include, incorporate, or otherwise use algorithms corresponding to the above-mentioned methods for classifying objects. In some embodiments, the object classifier 220 may be configured to use data from the ranging sensor 216 in conjunction with the image to assign a classification to the object. For instance, the object classifier 220 may be configured to use the ranging sensor 216 in conjunction with the image data to identify scale or size of the object, which may provide a further input to classify the object.

The valve control system 212 may be configured to generate control signals for the valve driver(s) 222, 224 which control the valves 202, 204. The valves 202, 204 may be positioned in respective conduits which connect the faucet 102 to a hot water source and cold water source, respectively. The valve driver(s) 222, 224 may be configured to control movement of the valves 202, 204, position of the valves 202, 204, etc. The valves 202, 204 and valve driver 222, 224 may generally form a mixing valve 226. The mixing valve 226 may be configured to receive a hot and cold water supply and regulate fluid flow characteristics out of the mixing valve 226 (e.g., to the faucet 102). The mixing valve 226 may be configured to regulate fluid flow from the hot water supply and fluid flow from the cold water supply. The mixing valve 226 may thus regulate fluid flow temperature, fluid flow rate, and fluid flow duration.

The valve control system 212 may be configured to store fluid flow settings corresponding to various object classifications. For instance, the valve control system 212 may store fluid flow settings as a look-up table. Each entry may correspond to an object classification. Each entry may include, for instance, respective valve 202, 204 positions for the hot and cold water supply to regulate fluid flow temperature, duration for which valves 202, 204 are to be opened to regulate fluid flow duration, spray pattern, and/or valve 202, 204 open percentage to regulate fluid flow rate. In some embodiments, the fluid flow settings may be pre-stored settings (e.g., factory default settings). In some embodiments, a user may be configured to modify the fluid flow settings by updating an entry in the look-up table. The user may update various entries in the look-up table by using, for instance, an application executing on the user's mobile device. The user may update an entry in the look-up table via the mobile application, and the updated entry may be communicated from the mobile device to, for instance, the valve control system 212 to update the look-up table.

In some embodiments, the valve control system 212 may be configured to receive or add new entries to the look-up table. For instance, the user may select a "new entry" option on their mobile device. The user may capture and upload (e.g., via their mobile device) one or more photographs of the object, for instance, while the object is positioned in the sink 106 or otherwise beneath the spout 104. The valve control system 212 may be configured to receive the photographs from the user's mobile device. The user may select fluid flow settings on the mobile device to provide when the object in the photographs is detected. The valve control system 212 may be configured to receive the fluid flow settings. The valve control system 212 may be configured to update the look-up table to the new entry from the user. Hence, the look-up table may be dynamic, in that a user may modify existing entries, add new entries, and so forth.

The valve control system 212 may be configured to cross-reference the classification assigned to an object in an image from the imaging sensor 214 with the look-up table to identify fluid flow settings for the object beneath the spout 104. The fluid flow settings may include, for instance, valve positions corresponding to fluid flow temperatures, a duration to keep open certain valves, various intervals for opening and closing certain valves, etc. The fluid flow settings may correspond to fluid flow characteristics of water flowing from the spout 104. Hence, the valve control system 212 may control the mixing valve 226 in accordance with the fluid flow settings to achieve or otherwise yield fluid flow characteristics from the mixing valve 226.

The valve control system 212 may be configured to control the mixing valve 226 based on the classification of the object assigned by the object classifier 220. The valve control system 212 may be configured to control the mixing valve 226 to adjust fluid flow characteristics based on the classification of the object assigned by the object classifier 220. The valve control system 212 may be configured to control the mixing valve 226 to adjust fluid flow temperature, fluid flow rate, and fluid flow duration based on the classification of the object assigned by the object classifier 220. In some embodiments, the valve control system 212 may be configured to control the mixing valve 225 based on the classification of the object and data from the ranging sensor 216. Various examples of objects and corresponding fluid flow characteristics are provided below. However, the present disclosure is not limited to these particular examples.

Referring now to FIG. 1 and FIG. 2, prior to a person positioning an object beneath the spout 104, the images captured by the imaging sensor 214 may include the sink 106 and surrounding areas based on a size of the field of view 124 for the imaging sensor 214. The person may position an object beneath the spout 104. The imaging sensor 214 provides an image of the object beneath the spout to the faucet control system 200. The ranging sensor 216 may also provide data corresponding to the object to the faucet control system 200. The data processing system 210 receives the data from the imaging sensor 214 and the ranging sensor 216. The image processing system 218 detects or otherwise identifies the object included in the image from the imaging sensor 214. The object classifier 220 assigns a classification to the object. The valve control system 212 generates control signals for the mixing valve 226 to direct water into the sink 106 with fluid flow characteristics (e.g., fluid flow temperature, fluid flow rate, fluid flow duration) based, at least, on the classification of the object.

As one example, a person may position their hands beneath the spout 104 to wash their hands. The imaging sensor 214 may capture an image of the person's hands beneath the spout 104. The imaging sensor 214 may transmit the image to the faucet control system 200. The image processing system 218 may identify the person's hands in the image based on the difference between the background (e.g., the sink 106) and the foreground (e.g., the hands) in the image. Hence, the image processing system 218 may generally indicate the presence of an object in the image 218 (which may be based on differences between the foreground and background). The object classifier 220 may assign a classification of "hands" to the object. The object classifier 220 may identify features of the object (for instance, fingers, general outline or shape, etc.) within the image. The valve control system 212 may identify the classification of the object assigned by the object classifier 220. The valve control system 212 may identify fluid flow settings based on the object classification (e.g., by cross-referencing the assigned classification for the object with data in a look-up table). The valve control system 212 may generate control signals to the mixing valve 226 to adjust fluid flow settings based on the classification of the object positioned beneath the spout. In this example, the fluid flow settings may provide for warm water (full-flow) for a duration of two minutes. The valve control system 212 may open the valve 202 for the hot water a certain percentage (e.g., 70%) and open the valve 204 for the cold water a certain percentage (e.g., 30%) to provide warm water. The valve control system 212 may open the valves 202, 204 for two minutes so that the person can wash their hands.

In some embodiments, the object classifier 220 may estimate an age of the person based on a size of their hands. The object classifier 220 may use data from the ranging sensor 216 to determine a distance of the hands from the ranging sensor 216. The distance, along with the image from the imaging sensor 214, may be used for identifying a scale of the hands in the image. The object classifier 220 may estimate the age of the person based on the size of their hands. The valve control system 212 may adjust fluid flow characteristics based on the age of the person washing their hands. For instance, the valve control system 212 may adjust the fluid flow temperature (for instance, provide cooler temperature water) based on the estimated age of a person. Such embodiments may act as a safety measure to prevent or lessen the likelihood of scalding a child's hands.

As another example, a person may position a toothbrush beneath the spout 104 for brushing their teeth. The imaging sensor 214 may capture an image of the person's toothbrush beneath the spout 104. The imaging sensor 214 may transmit the image to the faucet control system 200. The image processing system 218 may identify the person's toothbrush in the image based on the difference between the background (e.g., the sink 106) and the foreground (e.g., the toothbrush) in the image. Hence, the image processing system 218 may generally indicate the presence of an object in the image 218 (which may be based on differences between the foreground and background). The object classifier 220 may assign a classification of "toothbrush" to the object. The object classifier 220 may identify features of the object (for instance, bristles, outline or shape of the object, etc.) within the image. The valve control system 212 may identify the classification of the object assigned by the object classifier 220. The valve control system 212 may identify fluid flow settings based on the object classification (e.g., by cross-referencing the assigned classification for the object with data in a look-up table). The valve control system 212 may generate control signals to the mixing valve 226 to adjust fluid flow settings based on the classification of the object positioned beneath the spout. In this example, the fluid flow settings may provide for warm water (less than full-flow) for a short duration (e.g., 10 seconds), followed by a pause of two minutes, followed by warm water for another short duration (e.g., 10 seconds). The valve control system 212 may open the valve 202 for the hot water a certain percentage (e.g., 60%) and open the valve 204 for the cold water a certain percentage (e.g., 40%) to provide warm water. The valve control system 212 may open the valves 202, 204 for a short duration so that the person can wet their toothbrush/toothpaste, close the valves 202, 204 while the person is brushing their teeth (e.g., for two minutes), and re-open the valves 202, 204 for a short duration so the person can rinse their toothbrush.

As another example, a person may position a cup beneath the spout 104 for drinking water. The imaging sensor 214 may capture an image of the person's cup beneath the spout 104. The imaging sensor 214 may transmit the image to the faucet control system 200. The image processing system 218 may identify the person's cup in the image based on the difference between the background (e.g., the sink 106) and the foreground (e.g., the cup) in the image. Hence, the image processing system 218 may generally indicate the presence of an object in the image 218 (which may be based on differences between the foreground and background). The object classifier 220 may assign a classification of "cup" to the object. The object classifier 220 may identify features of the object (for instance, rounded edges, presence of ice, outline or shape of the object, etc.) within the image. The valve control system 212 may identify the classification of the object assigned by the object classifier 220. The valve control system 212 may identify fluid flow settings based on the object classification (e.g., by cross-referencing the assigned classification for the object with data in a look-up table). The valve control system 212 may generate control signals to the mixing valve 226 to adjust fluid flow settings based on the classification of the object positioned beneath the spout. In this example, the fluid flow settings may provide for cold water (full-flow) while the cup is positioned beneath the spout 104. The valve control system 212 may fully open the valve 204 for as long as the cup is positioned beneath the spout 204. In some embodiments, the ranging sensor 216 may provide feedback for a fill duration. For instance, the ranging sensor 216 may identify the relative depth of the bottom of the cup to the rim of the cup. When the cup is empty, the relative depth may be at a maximum. As the cup is filled with water, the relative depth may decrease in proportion to the amount of water added to the cup. The valve control system 212 may close the valve 204 when the relative depth decreases to a threshold relative depth (e.g., a half inch).

As yet another example, a person may position a pot beneath the spout 104 for boiling water. The imaging sensor 214 may capture an image of the person's pot beneath the spout 104. The imaging sensor 214 may transmit the image to the faucet control system 200. The image processing system 218 may identify the person's pot in the image based on the difference between the background (e.g., the sink 106) and the foreground (e.g., the pot) in the image. Hence, the image processing system 218 may generally indicate the presence of an object in the image 218 (which may be based on differences between the foreground and background). The object classifier 220 may assign a classification of "pot" to the object. The object classifier 220 may identify features of the object (for instance, rounded edges, scale, a handle, outline or shape of the object, etc.) within the image. The valve control system 212 may identify the classification of the object assigned by the object classifier 220. The valve control system 212 may identify fluid flow settings based on the object classification (e.g., by cross-referencing the assigned classification for the object with data in a look-up table). The valve control system 212 may generate control signals to the mixing valve 226 to adjust fluid flow settings based on the classification of the object positioned beneath the spout. In this example, the fluid flow settings may provide for hot water (full-flow) while the pot is positioned beneath the spout 104. The valve control system 212 may fully open the valve 202 for as long as the pot is positioned beneath the spout 204. Similar to the example provided above with reference to the cup, in some embodiments, the ranging sensor 216 may provide feedback for a fill duration. For instance, the ranging sensor 216 may identify the relative depth of the bottom of the pot to the rim of the pot. When the pot is empty, the relative depth may be at a maximum. As the pot is filled with water, the relative depth may decrease in proportion to the amount of water added to the pot. The valve control system 212 may close the valve 204 when the relative depth decreases to a threshold relative depth (e.g., a half inch).

As still another example, a person may position a dish beneath the spout 104 for cleaning the dish. The imaging sensor 214 may capture an image of the person's dish beneath the spout 104. The imaging sensor 214 may transmit the image to the faucet control system 200. The image processing system 218 may identify the person's dish in the image based on the difference between the background (e.g., the sink 106) and the foreground (e.g., the dish) in the image. Hence, the image processing system 218 may generally indicate the presence of an object in the image 218 (which may be based on differences between the foreground and background). The object classifier 220 may assign a classification of "dish" to the object. The object classifier 220 may identify features of the object (for instance, rounded edges, scale, outline or shape of the object, etc.) within the image. The valve control system 212 may identify the classification of the object assigned by the object classifier 220. The valve control system 212 may identify fluid flow settings based on the object classification (e.g., by cross-referencing the assigned classification for the object with data in a look-up table). The valve control system 212 may generate control signals to the mixing valve 226 to adjust fluid flow settings based on the classification of the object positioned beneath the spout. In this example, the fluid flow settings may provide for hot water (full-flow) while the dish is positioned beneath the spout 104. The valve control system 212 may fully open the valve 202 for as long as the dish is positioned beneath the spout 104.

While these examples are provided, various other examples are contemplated. For instance, identifying dirty pans, dishes, etc. based on surface conditions represented in the images, washing fruits and vegetables, etc. Each of these examples may have corresponding fluid flow settings associated therewith. The object classifier 220 may identify and classify these example objects in the image from the imaging sensor 214, and the valve control system 212 may adjust the mixing valve 226 to change the fluid flow characteristics based on the classification of the objects in the image. Such embodiments generally provide an automatically controlled faucet which adapts fluid flow characteristics to the type of object located beneath the spout.

In some embodiments, the faucet control system 200 may be configured to detect or recognize conditions when multiple objects are positioned in the sink 106. For instance, a person may position a plurality of dirty dishes in the sink 106. The object classifier 220 may be configured to identify and classify objects in the image from the imaging sensor 214 as dishes. The valve control system 212 may automatically control the faucet 102 to direct water towards the dishes. The faucet control system 200 may be configured to identify motion or movement of the dishes or other objects (e.g., hands) near the sink 106. For instance, the faucet control system 200 may be configured to detect the dishes have not moved for a duration of time exceeding a threshold (such as, for instance, 30 seconds, one minute, two minutes, and so forth). In such embodiments, the faucet control system 200 may be configured to automatically control the faucet 102 to close the valves and not direct water from the faucet 102.

In some embodiments, various fluid flow characteristics determined by the faucet control system 200 may be overridden under certain conditions. For instance, a user may be configured to manually select, change, modify, etc. fluid flow characteristics based on various user desires which may not be apparent via the object positioned beneath or proximate to the faucet 102. The user may manually modify the fluid flow characteristics by manually controlling (e.g., through rotation or other manipulation) various handles located in close proximity to the faucet 102. In some embodiments, the user may modify the fluid flow characteristics by providing one or more stored gestures corresponding to various fluid flow characteristics.

Figure 3:
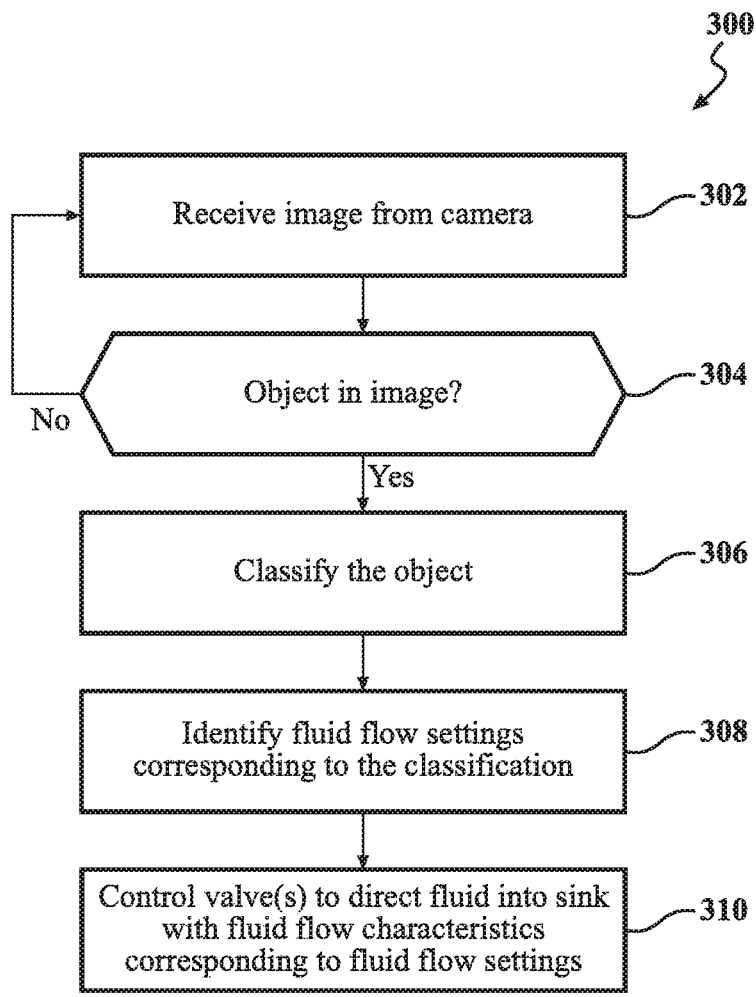
FIG. 3 is a flowchart showing an example method of automatically controlling a faucet.

Referring now to FIG. 3, depicted is a flow diagram for a method 300 of automatically controlling a faucet 102. The functionalities of method 300 may be implemented using, or performed by, the components described in FIGS. 1-2, such as the sensor(s) 122, the faucet control system 200, the mixing valve 226, and so forth.

At operation 302, the faucet control system 200 receives an image from the imaging sensor 214. The imaging sensor 214 may capture images at various intervals (e.g., every half second, every second, etc.). The imaging sensor 214 may provide the captured images to the faucet control system 200. The faucet control system 200 may receive each of the images captured by the imaging sensor 214.

At operation 304, the faucet control system 200 determines whether any objects are included in the image. An image processing system 218 of the faucet control system 200 may compare the image to one or more stored images associated with the sink 106. The stored images may be of empty sinks (e.g., images with no objects located in the foreground). The image processing system 218 may determine whether an object is included in the image based on the comparison (e.g., where the comparison indicates that the images do not match, do not match within a threshold degree, etc.). In some embodiments, the image processing system 218 may use the image as an input to a neural network or other artificial intelligence-type system. The neural network may be trained prior to deployment. The neural network may include a number of hidden layers used for detecting objects in images. The neural network may provide an output based on the input and hidden layers. The image processing system 218 may determine whether any objects are present in the image based on the outputs from the neural network. Where no objects are present within the image (e.g., the image only includes the sink 106), the method 300 may proceed back to operation 302. Where an object is present within the image, the method 300 may proceed to operation 306.

At operation 306, the object classifier 220 classifies the object included in the image. The object classifier 220 may identify various characteristics of the object within the image. For instance, the object classifier 220 may identify the object's shape, size, scale, color, or other distinguishing features. The object classifier 220 may be or include a neural network (similar to the neural network described above). The neural network may include hidden layers for evaluating the object's shape, appearance, size, etc. The neural network may provide an output, which may be a classification, based on such evaluation. The evaluation may include various algorithms which use various object classification techniques such as, for instance, object matching, object edge detection and matching, model matching, interpretation trees, and so forth. Various examples of classifications assigned to objects may include (but not limited to) hands (child/adult), pot, pan, dish, cup, bowl, fruit, vegetable, etc. The object classifier 220 may assign a classification to each object included in the image.

At operation 308, the valve control system 212 identifies fluid flow settings corresponding to the classification of the object assigned at operation 306. The valve control system 212 may include a look-up table (or other structured data) which includes a list of classifications and their corresponding fluid flow settings. The valve control system 212 may cross-reference the classification assigned to the object at operation 306 with the look-up table to identify fluid flow settings corresponding to the classification of the object. The fluid flow settings may include, for instance, valve positions corresponding to fluid flow temperatures, a duration to keep open certain valves, various intervals for opening and closing certain valves, etc. The fluid flow settings may correspond to fluid flow characteristics of water flowing from the spout 104.

At operation 310, the valve control system 212 controls the valve(s) to direct fluid into the sink with fluid flow characteristics corresponding to the fluid flow settings identified at operation 308. Where the faucet 102 includes a mixing valve 226, the valve control system 212 may communicate signals to the mixing valve 226 to control fluid flow characteristics of water from the mixing valve 226 and out of the spout 106. The valve control system 212 may control the valve(s) to have the fluid flow settings identified at operation 308. The valve control system 212 may control the valves to be open a certain amount or percentage, to be open for a certain duration, to open and close at various intervals, etc.

In some embodiments, the valve control system 212 may adjust the fluid flow temperature based on the classification of the object assigned at operation 306. In some embodiments, the valve control system 212 may adjust the fluid flow rate based on the classification of the object assigned at operation 306. In some embodiments, the valve control system 212 may adjust the fluid flow duration based on the classification of the object assigned at operation 306. In some embodiments, the valve control system 212 may adjust the fluid flow duration based on the classification of the object assigned at operation 306 and data from the ranging sensor 216. The ranging sensor 216 may provide data to the faucet control system 200 which corresponds to a relative depth of an object (for instance, an outer rim and bottom of a cup, pot, etc.). Where the object is empty, the relative depth is at its greatest. As the object is filled with water, the relative depth decreases. The fluid flow settings corresponding to the object (e.g., the cup, pot, etc.) may include a fluid flow duration which corresponds to the relative depth. The valve control system 212 may control the valves to direct water into the cup/pot until the relative depth decreases to a threshold.

In some embodiments, each of operations 302-310 may be performed locally (e.g., at or near the sink 106). For instance, the faucet control system 200 may be incorporated into or a component of a locally executing computing device. The computing device may be mounted, attached, or otherwise provided at or near the sink (for instance, underneath the sink, near the sink's housing, etc. The computing device may execute locally to prevent or lessen the likelihood of lag between objects being positioned beneath the sink and delivery of water from the spout to the sink. Such lag may be a product of components of the faucet control system 200 executing remotely and delivering commands to the valve drivers. Where the faucet control system 200 executes locally, such embodiments may provide more seamless object detection and classification and corresponding adjustment of fluid flow characteristics.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory itself, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps. Additionally, any element disclosed in one embodiment may be incorporated or utilized with any other embodiment disclosed herein.

What is claimed is:

1. A system for controlling a faucet, the system comprising:
    a spout configured to direct fluid into a sink;
    a camera arranged to capture images of the sink;
    a ranging sensor configured to generate data corresponding to relative depths corresponding to two or more surfaces of the object; and
    a processing circuit including a processor and memory, the memory storing instructions that, when executed by the processor, cause the processor to perform operations, the operations comprising:
        receiving an image captured by the camera;
        identifying in the image an object positioned beneath the spout, the identifying based on a comparison of a static image of the sink to the image received from the camera, wherein the static image comprises a previously captured image of a fixed background and is stored within the memory;
        analyzing the image received from the camera to identify a type of object included in the image received from the camera;
        causing the spout to direct fluid into the sink with fluid flow characteristics that correspond to the type of object identified in the image received from the camera in response to identifying the object beneath the faucet; and
        determining, based on data from the ranging sensor as fluid from the spout fills the object, a relative depth between an edge of the object and the fluid contained in the object, and wherein causing the spout to direct fluid into the sink with fluid flow characteristics that correspond to the object type in the image comprises:
            causing the spout to direct fluid into the sink to fill the object until the relative depth satisfies a threshold relative depth.

2. The system of claim 1, wherein the fluid flow characteristics include a fluid flow duration, a fluid flow temperature, and a fluid flow rate.

3. The system of claim 1, wherein the processing circuit executes locally at or near the sink.

4. The system of claim 1, wherein analyzing the image comprises:
    performing image processing on the image received from the camera, the image processing being performed locally at the sink via an image processing system stored in the memory of the processing circuit.

5. The system of claim 1, wherein the operations further comprise:
    determining, based on a plurality of images including the object, that the object is motionless;
    determining a duration in which the object is motionless and fluid is directed into the sink; and generating one or more control signals to cause one or more valves corresponding to the spout to close so as to not direct fluid from the spout.

6. The system of claim 1, further comprising a look-up table configured to store a plurality of object types and corresponding fluid flow characteristics, wherein the operations further comprise:
    determining the fluid flow characteristics corresponding to the object type in the image received from the camera by cross-referencing the identified object type with the look-up table.

7. A faucet, comprising:
    a spout configured to direct fluid into a sink;
    a ranging sensor configured to generate data corresponding to relative depths corresponding to two or more surfaces of the object; and
    a processing circuit including a processor and memory, the memory storing instructions that, when executed by the processor, cause the processor to perform operations, the operations comprising:
        receiving an image from a camera arranged to capture images of the sink;
        identifying in the image an object positioned beneath the spout, the identifying based on a comparison of a static image of the sink to the image received from the camera, wherein the static image comprises a fixed background and is stored within the memory;
        causing the spout to direct fluid into the sink with fluid flow characteristics that correspond to the type of object in the image received from the camera in response to identifying the object in the image; and
        determining, based on data from the ranging sensor as fluid from the spout fills the object, a relative depth between an edge of the object and the fluid contained in the object, and wherein causing the spout to direct fluid into the sink with fluid flow characteristics that correspond to the type of object in the image comprises:

causing the spout to direct fluid into the sink to fill the object until the relative depth satisfies a threshold relative depth.

8. The faucet of claim 7, wherein the fluid flow characteristics include a fluid flow duration, a fluid flow temperature, and a fluid flow rate.

9. The faucet of claim 7, wherein the operations further comprise:
   determining, based on a plurality of images including the object, that the object is motionless;
   determining a duration in which the object is motionless and fluid is directed into the sink; and
   generating one or more control signals to cause one or more valves corresponding to the spout to close, to not direct fluid from the spout.

10. The faucet of claim 7, wherein the memory of the processing circuit further stores a look-up table configured to store a plurality of object types and corresponding fluid flow characteristics, wherein the operations further comprise:
    determining the fluid flow characteristics corresponding to the object type in the image by cross-referencing an identified object type with the look-up table.

11. The faucet of claim 7, wherein the memory of the processing circuit further stores an image processing system, wherein the operations further comprise:
    performing image processing on the image received from the camera using the image processing system stored in memory to identify an object type, and wherein the fluid flow characteristics correspond to the identified object type.

12. A method of controlling a faucet, the method comprising:
    receiving, by a faucet control system, an image from a camera configured to capture images of a sink;
    identifying in the image an object positioned beneath a spout configured to direct fluid into the sink, the identifying based on a comparison of a static image of the sink to the image received from the camera, wherein the static image is a previously captured image of a fixed background;
    analyzing, by the faucet control system, the image received from the camera to identify an object type included in the image received from the camera;
    causing the spout to direct fluid into the sink with fluid flow characteristics that correspond to the object type in the image received from the camera in response to identifying the object in the image; and
    determining, by the faucet control system based on data from a ranging sensor configured to generate data corresponding to relative depths corresponding to two or more surfaces of objects, a relative depth between an edge of the object and the fluid contained in the object as fluid from the spout fills the object, and wherein causing the spout to direct fluid into the sink with fluid flow characteristics that correspond to the object type in the image comprises:
    causing the spout to direct fluid into the sink to fill the object until the relative depth satisfies a threshold relative depth.

13. The method of claim 12, wherein the fluid flow characteristics include a fluid flow duration, a fluid flow temperature, and a fluid flow rate.

14. The method of claim 12, further comprising:
    determining, based on a plurality of images including the object, that the object is motionless;
    determining a duration in which the object is motionless and fluid is directed into the sink; and
    generating one or more control signals to cause one or more valves corresponding to the spout to close, to not direct fluid from the spout.

15. The method of claim 12, wherein determining the fluid flow characteristics corresponding to the object type in the image comprises cross-referencing, by the faucet control system, the identified object type with a look-up table configured to store a plurality of object types and corresponding fluid flow characteristics.

\* \* \* \* \*